United States Patent
Ryu et al.

(10) Patent No.: US 12,044,886 B1
(45) Date of Patent: Jul. 23, 2024

(54) OPTICAL SYSTEM OF AUGMENTED REALITY GLASSES WITH SAW TOOTH-TYPE PARTIAL REFLECTOR ARRAY

(71) Applicant: Panovision Co., Ltd., Gyeonggi-do (KR)

(72) Inventors: Seonyoung Ryu, Gyeonggi-do (KR); Jangho Choi, Gyeonggi-do (KR); Sangjun Lee, Gyeonggi-do (KR)

(73) Assignee: Panovision Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/379,932

(22) Filed: Oct. 13, 2023

(30) Foreign Application Priority Data

Apr. 12, 2023 (KR) .................. 10-2023-0047991

(51) Int. Cl.
*G02B 6/27* (2006.01)
*G02B 6/26* (2006.01)
*G02B 27/01* (2006.01)

(52) U.S. Cl.
CPC .......... *G02B 6/2753* (2013.01); *G02B 6/262* (2013.01); *G02B 27/0172* (2013.01); *G02B 2027/0123* (2013.01); *G02B 2027/0178* (2013.01)

(58) Field of Classification Search
None
See application file for complete search history.

(56) References Cited

U.S. PATENT DOCUMENTS

| 8,384,999 | B1 * | 2/2013 | Crosby | G02B 27/0172 359/410 |
| 8,885,997 | B2 * | 11/2014 | Nguyen | G02B 27/0172 385/37 |

(Continued)

FOREIGN PATENT DOCUMENTS

CN 104536139 B 6/2017
JP 2021076840 A 5/2021

(Continued)

OTHER PUBLICATIONS

Office Action issued Jun. 23, 2023 in connection with Korean Patent Application No. 10-2023-0047991.

(Continued)

*Primary Examiner* — Collin X Beatty
(74) *Attorney, Agent, or Firm* — Akerman LLP

(57) ABSTRACT

The present disclosure relates to an optical system of augmented reality glasses with a saw tooth-type partial reflector array which projects image light and external image light to user's eyes with a high transmittance. To this end, the optical system of augmented reality glasses includes a display device 30 which generates image light; a polarization element 311 which is opposite to be parallel to the display device 30 and determines a polarized component of S-pol or P-pol; a lens 312 which is provided at one side of the polarization element 311 and magnifies and focuses the image light passing through the polarization element 311 to form a focal surface in the waveguide 32; and a lens 312 which is provided at one side of the polarization element 311 and focuses image light passing through the polarization element 311; and a waveguide 32 which allows the image light to be incident from the lens 312 and expand an exit pupil of the incident image light to a horizontal direction to be emitted toward the user 15, in which the waveguide 32 includes: a first surface 322 and a second surface 323 which (Continued)

allow the image light to be incident to be totally reflected and are parallel to each other; an incident surface 321 which forms a predetermined incident angle θi with the first surface 322; a partial reflector array 324 which is provided on the first surface 322 and the second surface 323 and has a saw tooth structure formed by alternately providing the transmissive surface 324a through which the totally reflected image light is transmitted and the reflective surface 324b through which the transmitted image light is reflected; and a polarization coating layer 325 which is formed on the saw tooth structure and has an angular bias that shows different reflectance according to the incident angle at which the light is incident on the transmissive surface 324a or the reflective surface 324b.

9 Claims, 8 Drawing Sheets

(56) References Cited

U.S. PATENT DOCUMENTS

| | | | | |
|---|---|---|---|---|
| 10,061,124 B2* | 8/2018 | Tervo | ............. | G02B 27/4205 |
| 10,191,288 B2* | 1/2019 | Singer | ............. | G02B 6/0076 |
| 10,394,032 B2* | 8/2019 | Singer | ............. | G02B 6/0076 |
| 10,935,730 B1* | 3/2021 | Lou | ............. | G02B 27/0172 |
| 2010/0134534 A1* | 6/2010 | Seesselberg | ......... | G02B 6/0038 |
| | | | | 345/690 |
| 2016/0231568 A1 | 8/2016 | Saarikko et al. | | |
| 2021/0033867 A1* | 2/2021 | Luo | ............. | G02B 27/0176 |

FOREIGN PATENT DOCUMENTS

| | | |
|---|---|---|
| KR | 100637572 B1 | 10/2006 |
| KR | 10-2007-0023622 A | 2/2007 |
| KR | 10-0977232 B1 | 8/2010 |
| KR | 101517299 B1 | 5/2015 |
| KR | 10-2201723 B1 | 1/2021 |

OTHER PUBLICATIONS

Notice of Allowance issued Feb. 2, 2024 in connection with Korean Patent Application No. 10-2023-0047991.

* cited by examiner

OPTICAL SYSTEM OF AUGMENTED REALITY GLASSES WITH SAW TOOTH-TYPE PARTIAL REFLECTOR ARRAY

CROSS-REFERENCE TO RELATED APPLICATIONS

This application claims the priority of Korean Patent Application No. 10-2023-0047991 filed on Apr. 12, 2023, in the Korean Intellectual Property Office, the disclosure of which is incorporated herein by reference.

BACKGROUND

Field

The present disclosure relates to a head mount display, and more particularly, to an optical system of augmented reality glasses with a saw tooth-type partial reflector array which projects image light and external image light to user's eyes with a high transmittance.

Description of the Related Art

Generally, the head mounted display (HMD) is a device which displays images while being worn on a head of the user. Recently, a technology which provides virtual reality or augmented reality contents using a head mounted display is increasing.

A transmissive HMD optical system using a diffractive waveguide is applied to the head mounted display. FIG. 1 is a conceptual view of an exit pupil expanding diffractive optical system. As illustrated in FIG. 1, a diffractive light guide plate 10 includes a light guide unit 11 and a plurality of diffractive optical elements 12, 13, and 14 which is provided on one side or the other side of the optical guide unit 11 and includes a plurality of linear fine lattice patterns. The diffractive light guide plate 10 includes an input diffractive optical element 12 which receives light output through the optical source output module 5 to guide the light onto the light guide unit 11, an intermediate diffractive optical element 13 which is optically coupled to the input diffractive optical element 12 through the light guide unit 11 and diffracts light received from the input diffractive optical element 12 to primarily expand in a first direction (an x-axis direction in FIG. 1), and an output diffractive optical element 14 which is optically coupled to the intermediate diffractive optical element 13 through the light guide unit 11 and diffracts light received from the intermediate diffractive optical element 13 to output light from the light guide unit 11 while primarily expanding in a second direction (a y-axis direction in FIG. 1) and direct the light to a pupil of the user 15.

A diffractive optical system of the related art has a main light path to allow light output through the light source output module 5 to reach a pupil of the user 15 in the order of the input diffractive optical element 12—the intermediate diffractive optical element 13—the output diffractive optical element 14—the pupil of the user 15. Since an area of output light output from the final output diffractive optical element 14 is much larger than an area of an initial input diffractive optical element 12 in both a horizontal (x-axis) direction and a vertical (y-axis) direction so that exit pupils (eye-box) horizontally and vertically expand. Therefore, the user may more conveniently watch output image light. Here, the exit pupil refers to the largest area size at which the same image light can be viewed at a maximum viewing angle. As the size of the exit pupil is large, a range in which the pupil of the user 15 is located is increased so that the convenience of the user may be increased.

However, in the exit pupil expansion diffractive optical system of the related art, the input diffractive optical element 12, the intermediate diffractive optical element 13, and the output diffractive optical element 14 are separately disposed on the light guide unit 11 and a lot of internal total reflection and diffraction from input to output of the image light are performed. Therefore, a surface of the light guide unit 11 and each of the diffractive optical elements 12, 13, and 14 need to be very precisely processed. If not, there is a high possibility of causing double images on the image or outputting an unclear image so that there is a disadvantage in that the mass productivity is greatly degraded.

Further, due to the physical property of the diffraction, an amount of diffracted light at a desired angle is much smaller than an amount of reflected light through geometrical optics and the image light is output through a total of three times of diffractive reaction so that the optical efficiency is significantly degraded. For this reason, there is another disadvantage in that very strong incident light needs to be used. Further, the diffraction is performed in a plurality of directions so that the output light is generated not only in the pupil direction of the user 15, but also in an opposite direction so that a screen which is viewed by a user is simultaneously seen from the outside, which may cause a security problem.

RELATED ART DOCUMENT

[Patent Document]
1. US Patent Application Publication No. 20160231568
2. Korean Registered Patent Publication No. 10-2201723
3. Korean Registered Patent Publication No. 10-977232

SUMMARY

Accordingly, the present disclosure is contrived to solve the above-described problems and a first object of the present disclosure is to provide an optical system of augmented reality glasses with a saw tooth-type partial reflector array which minimizes a volume and a weight by applying a waveguide which folds the image light through total reflection of light in a material and expands a size of the exit pupil by reactivating the exit pupil of the image light.

A second object of the present disclosure is to provide an optical system of augmented reality glasses with a saw tooth-type partial reflector array which maximizes an optical efficiency by excluding a diffractive optical unit with a lot of light loss, but applying a geometrical reflective surface to reduce power loss and provide a bright screen.

A third object of the present disclosure is to provide an optical system of augmented reality glasses with a saw tooth-type partial reflector array which includes the saw tooth-type partial reflector array structure to simplify a structure of an image light extraction unit in the waveguide to enable mass production of plastic injection and manufactures a reflector array by applying uniform functional coating to the entire saw tooth structure to have a competitive price by reducing a unit price of the product.

A fourth object of the present disclosure is to provide an optical system with enhanced security which not only increases an extraction efficiency of image light directed to the user's pupil by applying a polarization coating with an angular bias on the saw tooth structure, but also prevents the same image watched by the user from being viewed from the outside by blocking a light path output to an opposite direction of the pupil.

Technical objects to be achieved in the present disclosure are not limited to the aforementioned technical objects, and another not-mentioned technical object will be clearly understood by those skilled in the art from the description below.

In order to achieve the above-described technical objects, an optical system of augmented reality glasses with a saw tooth-type partial reflector array includes a display device 30 which generates image light; a polarization element 311 which is opposite to be parallel to the display device 30 and determines a polarized component of S-pol or P-pol; a lens 312 which is provided at one side of the polarization element 311 and magnifies and focuses the image light passing through the polarization element 311 to form a focal surface in the waveguide 32; and a lens 312 which is provided at one side of the polarization element 311 and focuses image light passing through the polarization element 311; and a waveguide 32 which allows the image light to be incident from the lens 312 and expand an exit pupil of the incident image light to a horizontal direction to be emitted toward the user 15, in which the waveguide 32 includes: a first surface 322 and a second surface 323 which allow the image light to be incident to be totally reflected and are parallel to each other; an incident surface 321 which forms a predetermined incident angle θi with the first surface 322; a partial reflector array 324 which is provided on the first surface 322 and the second surface 323 and has a saw tooth structure formed by alternately providing the transmissive surface 324a through which the totally reflected image light is transmitted and the reflective surface 324b through which the transmitted image light is reflected; and a polarization coating layer 325 which is formed on the saw tooth structure and has an angular bias that shows different reflectance according to the incident angle at which the light is incident on the transmissive surface 324a or the reflective surface 324b.

Further, a transmission angle θt of the image light on the transmissive surface 324a is configured to be smaller than a reflection angle θr of the image light on the reflective surface 324b.

Further, the transmission surface 324a is configured such that the transmission angle θt of the image light on the transmissive surface 324a is 0° to 20°, and desirably, a transmission angle θt of center light of the image light is 0°.

Further, the reflection surface 324b is configured such that the reflection angle θr of the image light on the reflective surface 324b is 45° to 70°.

The polarization coating layer 325 has an S-pol component and when a transmission angle θt is in the range of 0° to 20°, a reflectance is configured to have 10% or lower.

The polarization coating layer 325 has an S-pol component and when a reflection angle θt is in the range of 45° to 70°, a reflectance is configured to have 50% or higher.

Further, the polarization element 311 determines a polarized component of S-pol.

The plurality of reflective surfaces 324b is parallel to each other or the plurality of transmissive surfaces 324a is parallel to each other.

The incident angle θi and the reflection angle θsr may satisfy the following Equation 1.

$$\theta sr = \theta i/2 \quad (1)$$

The incident angle θi and the reflection angle θsr may satisfy the following Equation 2.

$$\theta st = 90° - \theta i \quad (2)$$

Further, the transmission angle θst may have an angle in the range of −10° to 10° rather than 90°−the incident angle θi.

Further, the polarization element 311 may be at least one of a reflective polarization film, an absorptive polarization film, a polarizing coating which converts an unpolarized beam or partially polarized beam into a linearly polarized beam to be transmitted or reflected, and a means to convert a direction of a polarized component using a phase shift element.

According to the exemplary embodiment of the present disclosure, the volume and the weight are minimized by applying a waveguide which folds image light by total reflection in the material of light and an exit pupil expanding unit is provided so that when the glass-type augmented device is implemented, the burden of users may be reduced. Accordingly, a foam factor of the optical system may be reduced, and the optical efficiency may be improved to the maximum.

Further, the sensitivity to the reflection error is lowered by minimizing the number of times of internal reflection and total reflection of the image light in the waveguide to have an economic feasibility to enable mass production of plastic injection and significantly reduce a unit price of the product.

Further, as an output means of the image light from the inside of the waveguide to the outside, the diffractive optical unit with a lot of light loss is excluded, and a geometrical reflection surface is applied to maximize the optical efficiency, thereby reducing the power loss and providing a bright screen.

Further, image light which is incident into the waveguide is precisely guided by a geometric optical method and a light path which is output to an opposite direction to the pupil of the user is blocked to enhance the security so that the image which is viewed by the user is not seen from the outside.

Further, there are advantages in that it is easy to manufacture, assembling is simple to enable mass production, and the manufacturing cost is significantly lowered.

Furthermore, an augmented reality system which simultaneously watches external images T1 and T2 and image light from the display device 30 may be implemented.

A technical object to be achieved in the present disclosure is not limited to the aforementioned effects, and other not-mentioned effects will be obviously understood by those skilled in the art from the description below.

BRIEF DESCRIPTION OF DRAWINGS

The following drawings attached to the present specification illustrate the preferred exemplary embodiment of the present disclosure and are provided for better understanding of the technical spirit of the present disclosure together with the detailed description of the invention to be described. Therefore, the present disclosure should not be construed as being limited only to the matters described in the drawings.

DETAILED DESCRIPTION OF THE EMBODIMENT

In the following detailed description, only certain exemplary embodiments of the present disclosure have been shown and described, simply by way of illustration. Description of the present disclosure is just an exemplary embodiment for structural and functional description so that the scope of the present disclosure is not interpreted to be limited by the exemplary embodiment described in the specification. That is, the exemplary embodiment may be modified in various forms so that it is understood that the scope of the present disclosure has equivalents which are capable of implementing the technical spirit. Further, it does not mean that the specific exemplary embodiment includes the object or effect proposed in the present disclosure or includes only the effect so that it is not understood that the scope of the present disclosure is limited thereby.

In the meantime, meanings of terms described in the present disclosure can be understood as follows.

The terms "first", "second", or the like are used to distinguish one component from the other component so that the scope should not be limited by these terms. For example, a first component may be referred to as a second component, and similarly, a second component may be referred to as a first component. It should be understood that, when it is described that an element is "connected" to another element, the element may be directly connected to the other element or connected to the other element through a third element. In contrast, it should be understood that, when it is described that an element is "directly connected" to another element, no element is present between the element and the other element. In the meantime, other expressions which describe the relationship between components, that is, "between" and "directly between", or "adjacent to" and "directly adjacent to" need to be interpreted by the same manner.

Unless the context apparently indicates otherwise, it should be understood that terms "include", "have", or the like indicate that a feature, a number, a step, an operation, a component, a part or the combination thereof described in the specification is present, but do not exclude a possibility of presence or addition of one or more other features, numbers, steps, operations, components, parts or combinations thereof, in advance.

Unless they are contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present disclosure.

Figure 1:
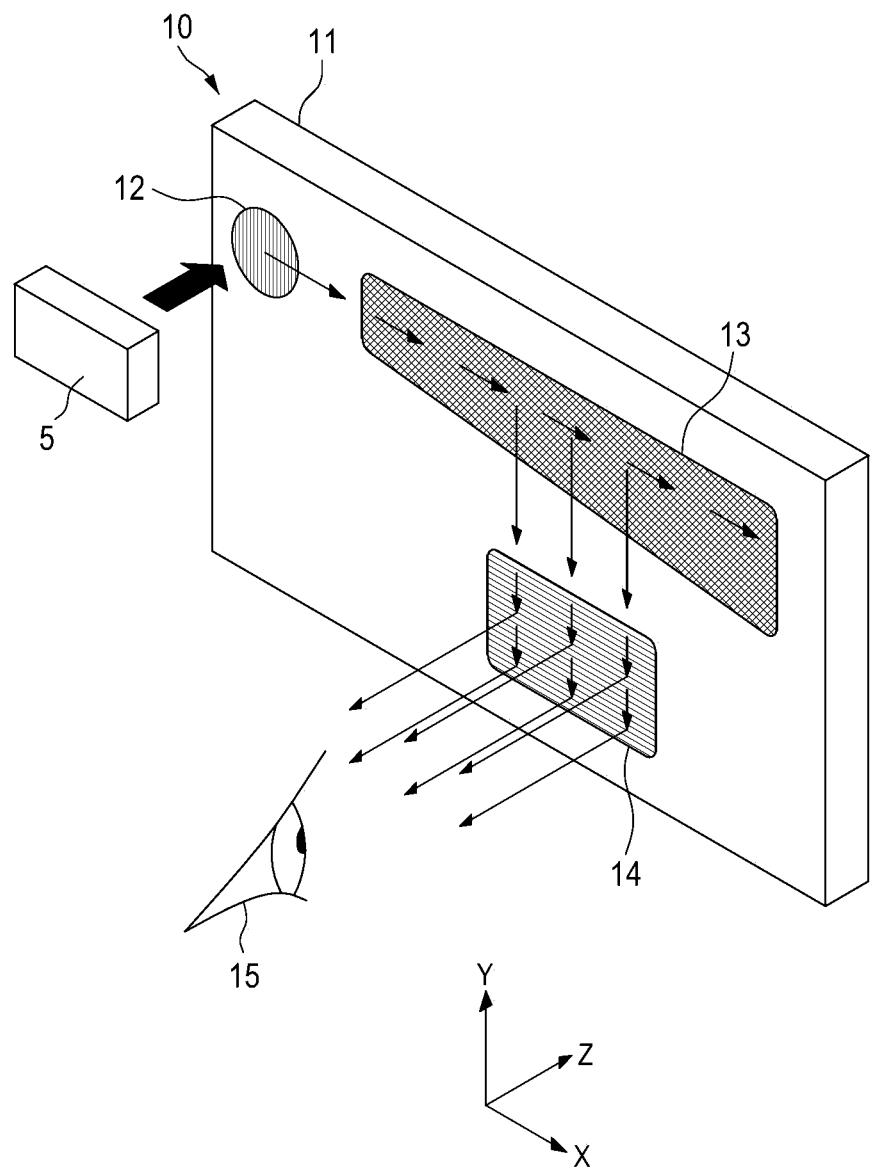
FIG. 1 is a conceptual view of an exit pupil expanding diffractive optical system.
Figure 2:
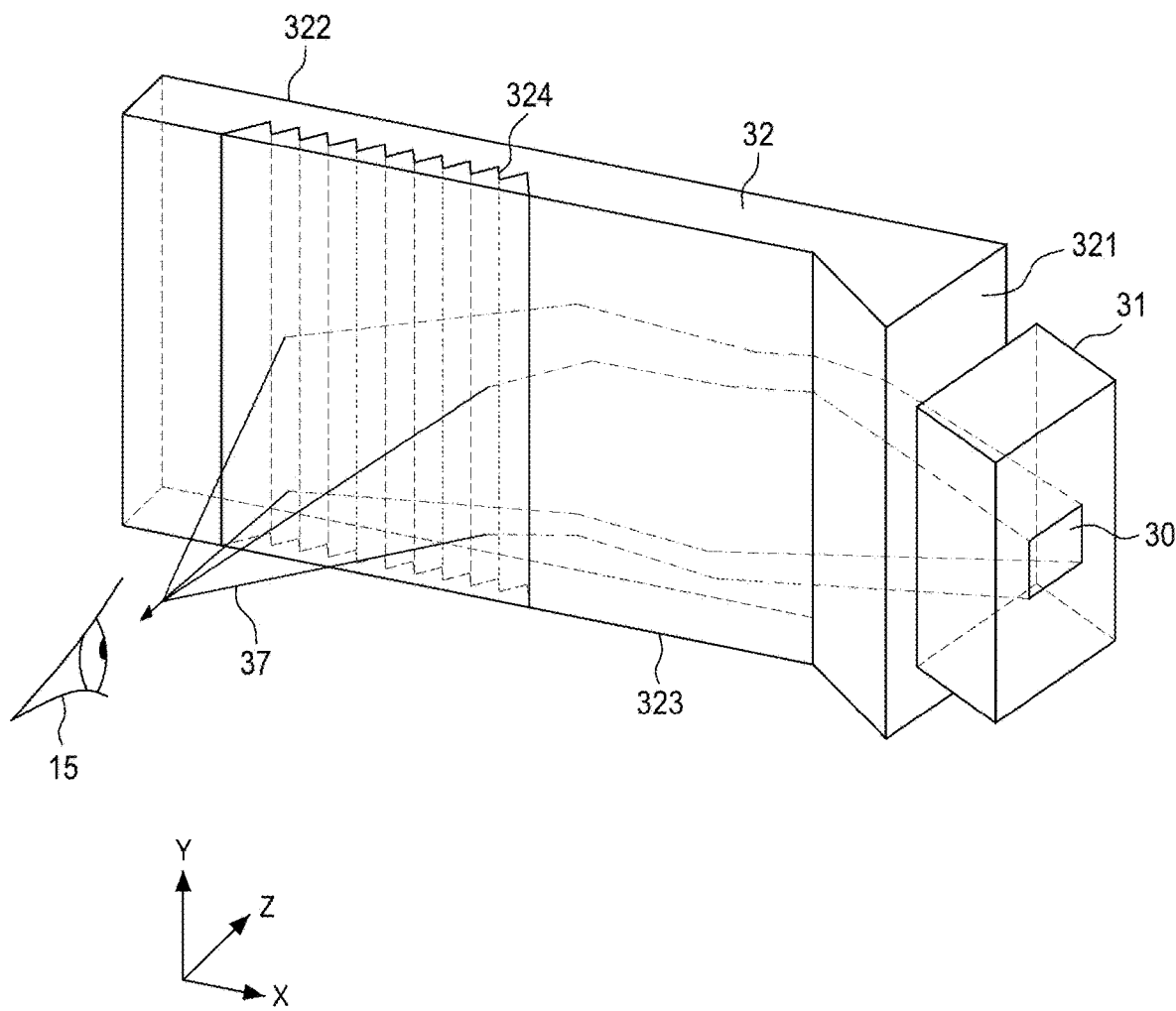
FIG. 2 is a perspective view of an augmented reality glass with a saw tooth-type partial reflector array according to the present disclosure.
Figure 3:
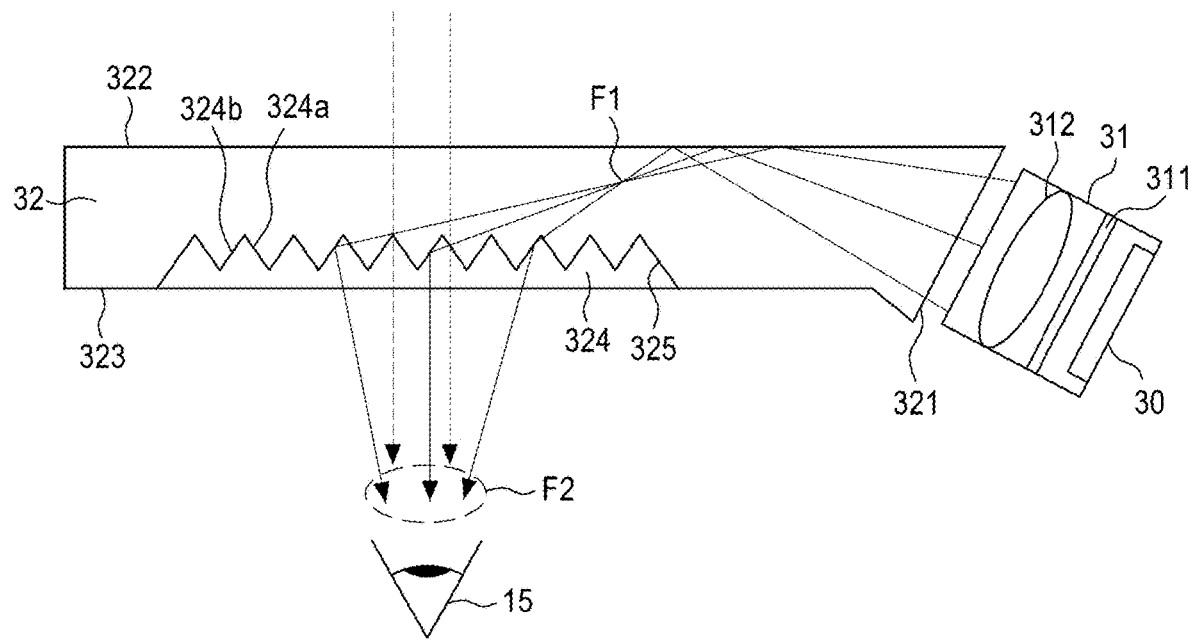
FIG. 3 is a plan view of FIG. 2.
Figure 4:
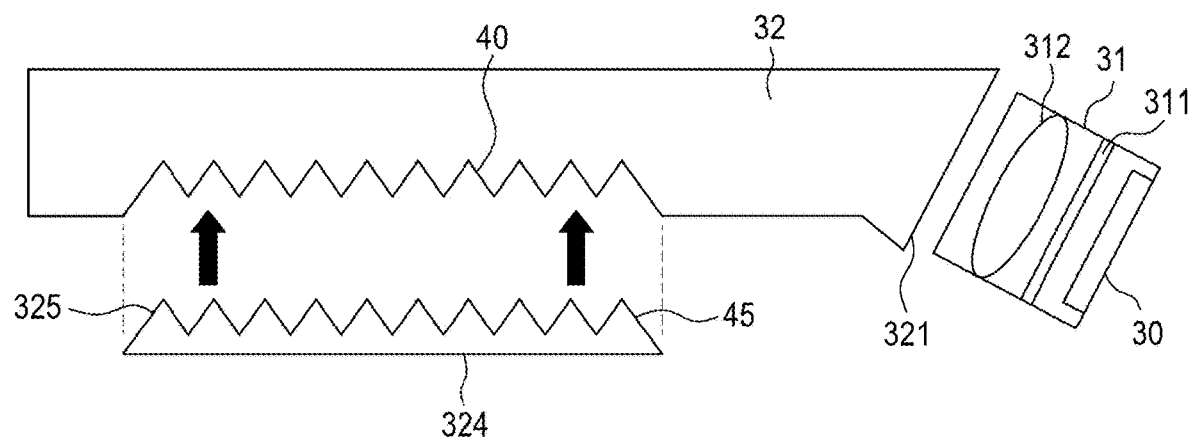
FIG. 4 is a plan view illustrating an exploded state of a partial reflector array 324 in FIG. 3.

Hereinafter, preferred exemplary embodiments will be described in detail with reference to the accompanying drawings. FIG. 2 is a perspective view of an augmented reality glass with a saw tooth-type partial reflector array according to the present disclosure, FIG. 3 is a plan view of FIG. 2, and FIG. 4 is a plan view illustrating an exploded state of a partial reflector array 324 in FIG. 3. As illustrated in FIGS. 2 to 4, the present disclosure is approximately configured by an incident optical system 31 and a waveguide 32.

The incident optical system 31 includes a display device 30, a polarization element 311, and a lens 312. The display panel 30 is a micro display having a fine pixel structure, such as an LCD panel, an OLED panel, an OLEDos panel, and an LCOS panel.

The polarization element 311 is provided to be parallel to the display device 30 and selectively passes a polarized component of S-pol or P-pol. In the exemplary embodiment, the polarization element 311 selects a polarized component of S-pol. The polarization element 311 may be at least one of a reflective polarization film, an absorptive polarization film, a polarization coating which converts an unpolarized beam or partially polarized beam into a linearly polarized beam to be transmitted or reflected, and a means to convert a direction of a polarized component using a phase shift element.

The lens 312 is provided at one side of the polarization element 311 and magnifies and focuses the image light which passes through the polarization element 311 to form a first focus F1 in the waveguide 32. The lens 312 may be one or a combination of a plurality of lenses.

The waveguide 32 serves to allow the image light to be incident from the lens 312 and expand an exit pupil of the incident image light to a horizontal direction to be emitted toward the user 15. The waveguide 32 has first and second surfaces 322 and 323 which are parallel to each other and an incident surface 321 which expands to be tapered at one side is integrally formed. The incident surface 321 forms a predetermined incident angle θi (for example, 50° to 80°) with the first surface 322 and is located parallel to the incident optical system 31.

The partial reflector array 324 is formed in a free end area range which is opposite to the incident surface 321 from the middle area of the waveguide 32 and has a saw tooth shape in a planar direction and is represented as a line which is vertical in the front direction and is parallel.

FIG. 3 is a view explaining a principle of expanding an exit pupil using a divided reflective surface 324b. Referring to FIG. 3, the saw tooth-type partial reflector array 324 is installed between the first surface 322 and the second surface 323 in the waveguide 32. The saw tooth-type partial reflector array 324 is configured by an array of transmissive surfaces 324a through which the image light passes and reflective surfaces 324b through which the image light is reflected and the transmissive surfaces 324a and the reflective surfaces are installed to be parallel to each other, respectively.

The image light collimated in the display device 30 is focused by the incident optical system 31 to be totally reflected from the first surface 322 in the waveguide 32. Thereafter, the image light which changes the direction and forms a primary exit pupil (first focus F1) area before reaching the saw tooth-type reflective surface 324b and then radiates again is divided and reflected by a plurality of partial reflector arrays 324 installed to be parallel to form a secondary exit pupil (second focus F2) in front of the eyeball of the user 15.

As described above, the image light which passes through the primary exit pupil (first focus F1) is formed by expanding the size of the exit pupil in front of the eyeball of the user 15 using a plurality of partially reflectively coated reflective surfaces 324b so that the user may see the image light in a wider area. Therefore, the wide optical viewing angle may be easily configured.

As illustrated in FIG. 4, the partial reflector array 324 is implemented by combining a female saw tooth portion 40 and a male saw tooth portion 45. The waveguide 32 and the partial reflective array 324 may be manufactured by plastic injection.

The partial reflective array 324 is a separated component and has a male saw tooth portion 45 which is fitted to the female saw tooth portion 40.

The polarization coating layer 325 in which a transmission or reflection level varies according to an incident angle of the image light, or a polarized component of the image light may be further provided between the female saw tooth portion 40 and the male saw tooth portion 45. The polarization coating layer 325 may be formed on the female saw tooth portion 40 and optionally formed on the male saw tooth portion 45. The polarization coating layer 325 has an angular bias which transmits the image light on a surface incident at a small angle and reflects the image light on a surface incident at a large angle. The polarization coating layer 325 has an S-pol component and when a transmission angle θt is in the range of 0° to 20°, a reflectance is configured to have 10% or lower.

When the waveguide 32 is assembled, the partial reflector array 324 is bonded by a transparent optical adhesive to be finished. The optical adhesive may use a known adhesive. The waveguide 32, the partial reflector array 324, and the optical adhesive may use optical materials having the same refractive index.

Figure 5:
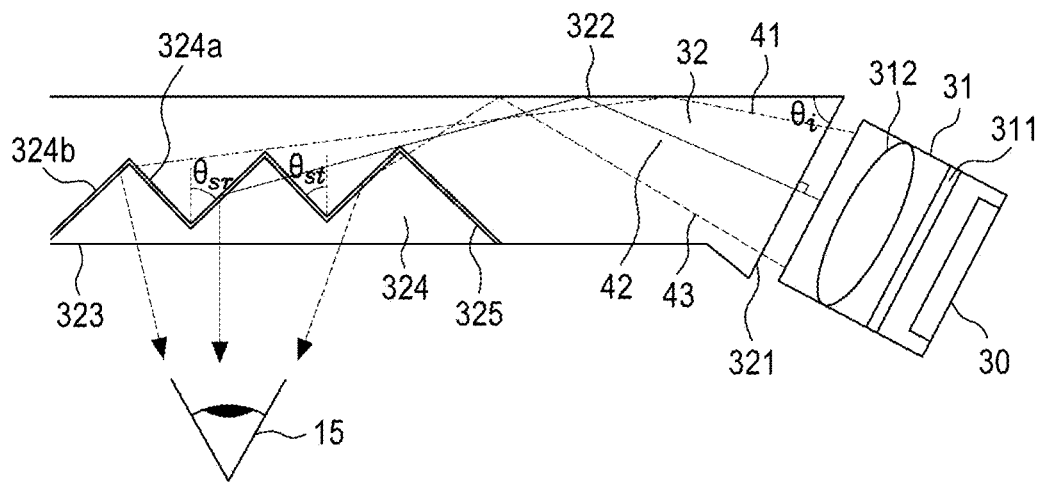
FIG. 5 is a view of an optical operation state of an optical system of augmented reality glasses illustrated in FIG. 2.
Figure 6:
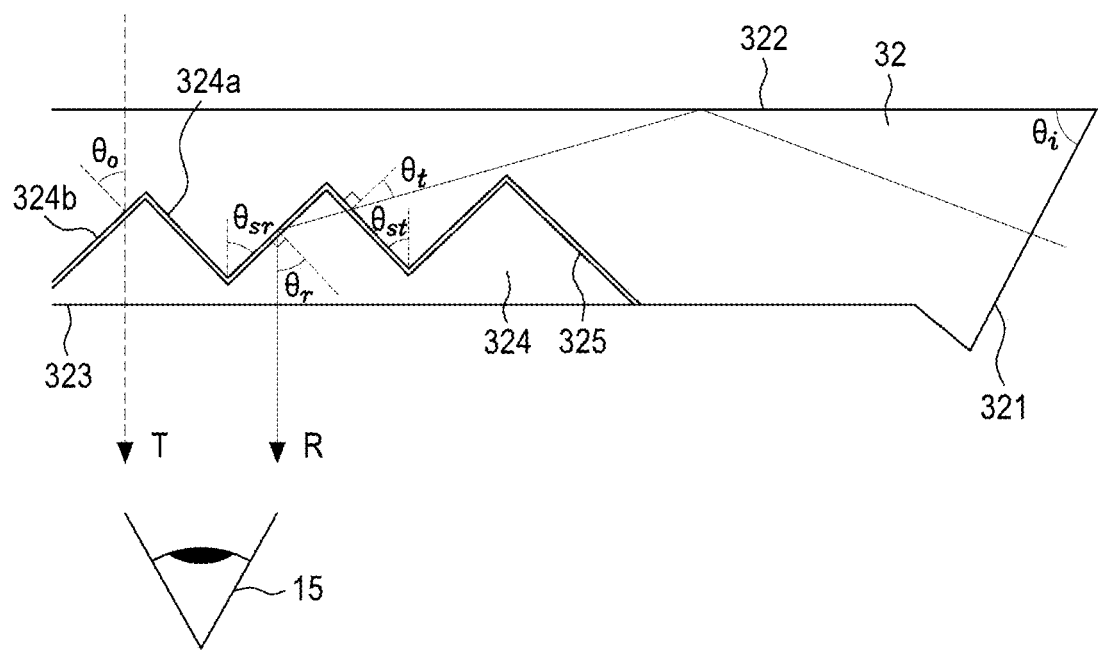
FIG. 6 is an operation view of a partial reflector array 324 of FIG. 5.
Figure 7:
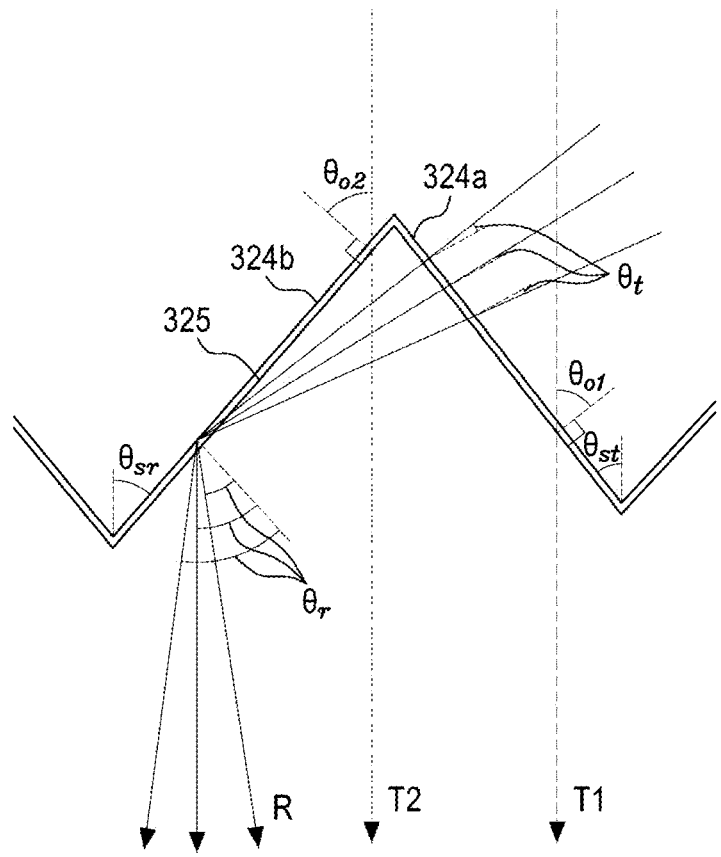
FIG. 7 is an optical partial detailed view of a transmissive surface 324a and a reflective surface 324b.

FIG. 5 is an optical operation state view of an optical system of augmented reality glasses illustrated in FIG. 2, FIG. 6 is an operation view of a partial reflector array 324 of FIG. 5, and FIG. 7 is an optical partial detailed view of a transmissive surface 324a and a reflective surface 324b. As illustrated in FIGS. 5 to 7, in the partial reflector array 324, the reflective surfaces 324b and the transmissive surfaces 324a are alternately disposed and the plurality of reflective surfaces 324b is parallel to each other and/or the plurality of transmissive surfaces 324a is parallel to each other.

A transmission angle θt of the image light on the transmissive surface 324a is configured to be smaller than a reflection angle θr of the image light on the reflective surface 324b. For example, the transmissive surface 324a may be configured such that the transmission angle θt of the image light is 0° to 20°, and desirably, a transmission angle θt of center light of the image light is 0°.

The reflective surface 324b is configured such that the reflection angle θr of the image light on the reflective surface 324b is 45° to 70°.

FIG. 5 is a view illustrating a position of an incident optical system 31 including a display device 30, a relationship of an inclined angle θi of the waveguide incident surface 321 and a reflection angle θsr of the reflective surface 324b of a partial reflector array 324 installed in the waveguide 32, and a relationship with a transmission angle θst of the transmissive surface. Referring to FIG. 5, in order to transmit the image light emitted from the display device 30 to the eyeball of the user 15 using the thin waveguide 32, the incident surface 321 of the waveguide needs to be inclined at a predetermined angle θi so that both a minimum angle and a maximum angle of the image light need to be totally reflected in the waveguide 32. In order to allow the user 15 to coaxially view the incident image angle, the center light 42 of the image light needs to be perpendicularly incident onto the incident surface 321 of the waveguide 32 and the incident image light needs to be emitted perpendicularly to the second surface 323 of the waveguide 32. Accordingly, the incident angle θi of the waveguide incident surface 321 and the reflection angle θsr of the reflective surface 324b installed in the waveguide 32 are determined by the following Equation 1.

$$\theta sr = \theta i/2 \quad (1)$$

At this time, in order to minimize a chromatic aberration of the image light, it is desirable to allow the center light 42 of the image light to be incident perpendicularly onto the transmissive surface 324a. Accordingly, the incident angle θi of the waveguide incident surface 321 and the transmission angle θsr of the transmissive surface 324a installed in the waveguide 32 are determined by the following Equation 2.

$$\theta st = 90° - \theta i \quad (2)$$

The image light incident at the incident angle θi of the incident surface 321 is totally reflected by the first surface 322 or the second surface 323 and then reflected from the saw tooth-type reflective surface 324b one time and then is emitted to the eyes of the user 15. At this time, in order to minimize the light transmission loss, the image light which is incident onto the waveguide 32 is reflected from the first surface 322 one time and then reflected from the saw tooth-type reflective surface 324b one time to be emitted.

Further, the transmission angle θst may have an angle in the range of −10° to 10° rather than 90°−the incident angle θi.

Referring to FIG. 6, in order to implement an optical system with an augmented reality function, the image light which is incident into the waveguide 32 needs to be totally reflected from the first surface 322 of the waveguide 32 and then output (R) to the eyes of the user 15 by the saw tooth-type partial reflector array 324 and also the external image needs to be transmitted (T) through the waveguide 32 to be transmitted to the eyes of the user 15. Accordingly, the image light incident into the waveguide 32 needs to be transmitted through the saw tooth-type transmissive surface 324a and the image light needs to be reflected from the saw tooth-type reflective surface 324b. At this time, the saw structure also has a transmission performance to transmit the external image to the eyes of the user 15.

FIG. 7 is an optical partial detailed view of a transmissive surface 324a and a reflective surface 324b. As illustrated in FIG. 7, the image light which forms a final viewing angle has a small transmission angle θt within the range of 0° to 20° with respect to the saw tooth-type transmission surface 324a and has a large reflection angle θr in the range of 45° to 70° with respect to the saw tooth-type reflective surface 324b. At this time, in order to minimize the loss of the image light and minimize the chromatic aberration, the center angle of the transmission angle θt is desirably 0°. Further, the transmission angle of the external field of view is determined by the inclined angle of the saw tooth structure so that the first transmission angle θo1 of the external field of view is determined as 90°−θst. Further, the second transmission angle θo2 of the external field of view is determined as 90°−θsr. Accordingly, the polarization coating layer 325 of the saw tooth surface has an angular bias that satisfies the conditions of a low reflectance at a small transmission angle, a high reflectance at a large transmission angle, and a high transmittance at a transmission angle of the external field of view.

Figure 8:
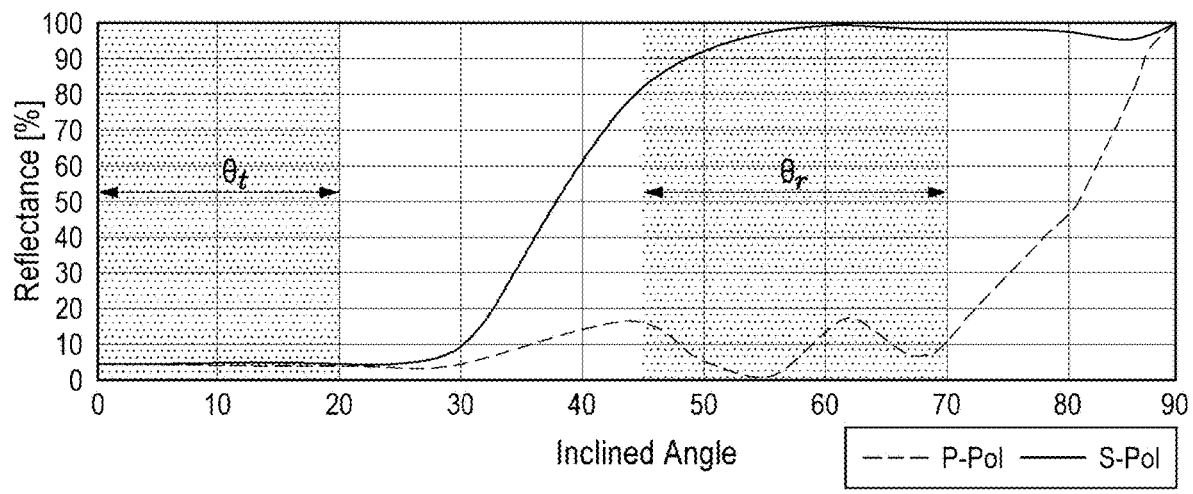
FIG. 8 is a graph illustrating an optical characteristic of a functional polarization coating layer 325 according to the present disclosure.

FIG. 8 is a graph illustrating an optical characteristic of a functional polarization coating layer 325 according to the present disclosure. As illustrated in FIG. 8, the condition for satisfying a functionality of the polarization coating layer 325 may be implemented by the polarization coating layer

325 with an angular bias. The S-pol component of the polarization coating layer 325 has a low reflectance of 10% or less in the range of a small transmittance angle θt of 0° to 20° and has a high reflectance of 50% or more at a large reflection angle including the range of 45° to 70°. At this time, the polarized component of P-pol shows a reflectance of 20% or less at a wide angle range of 0° to 70° so that most light is transmitted. Accordingly, the image light having S-pol may be emitted to the eyes of the user with a high reflectance and the external image having P-pol component is also transmitted to the eyes of the user 15 with a high transmittance to implement an optical system with an augmented reality function.

As described above, the detailed description of the exemplary embodiments of the disclosed present disclosure is provided such that those skilled in the art implement and carry out the present disclosure. While the invention has been described with reference to the preferred exemplary embodiments, it will be understood by those skilled in the art that various changes and modifications of the present disclosure may be made without departing from the spirit and scope of the invention. For example, those skilled in the art may use configurations disclosed in the above-described exemplary embodiments by combining them with each other. Therefore, the present disclosure is not intended to be limited to the above-described exemplary embodiments but to assign the widest scope consistent with disclosed principles and novel features.

The present disclosure may be implemented in another specific form within the scope without departing from the spirit and essential feature of the present disclosure. Therefore, the detailed description should not restrictively be analyzed in all aspects and should be exemplarily considered. The scope of the present disclosure should be determined by rational interpretation of the appended claims and all changes are included in the scope of the present disclosure within the equivalent scope of the present disclosure. The present disclosure is not intended to be limited to the above-described exemplary embodiments but to assign the widest scope consistent with disclosed principles and novel features. Further, claims having no clear quoting relation in the claims are combined to configure the exemplary embodiment or may be included as new claims by correction after application.

What is claimed is:

1. An optical system of augmented reality glasses with a saw tooth-type partial reflector array, comprising:
   a display device which generates image light;
   a polarization element which is opposite to be parallel to the display device and determines a polarized component of S-pol or P-pol;
   a lens which is provided at one side of the polarization element and magnifies and focuses the image light passing through the polarization element to form a focal surface in a waveguide; and
   the waveguide which serves to allow the image light to be incident from the lens and expand an exit pupil of the incident image light to a horizontal direction to be emitted toward a user,
   wherein the waveguide includes:
   a first surface and a second surface which allow the image light to be incident to be totally reflected and are parallel to each other;
   an incident surface which forms a predetermined incident angle (θi) with the first surface;
   a partial reflector array which is provided on the first surface and the second surface and has a saw tooth structure formed by alternately providing a transmissive surface through which the totally reflected image light is transmitted and a reflective surface through which the transmitted image light is reflected; and
   a polarization coating layer which is formed on the saw tooth structure and has an angular bias which shows different reflectance according to the incident angle incident to the transmissive surface or the reflective surface,
   wherein a transmission angle (θt) of the image light on the transmissive surface is smaller than a reflection angle (θr) of the image light on the reflective surface,
   wherein the incident angle (θi) and the reflection angle (θsr) satisfy the following Equation 1 and $$\theta sr = \theta i/2 \qquad (1)$$

the incident angle (θi) and the transmission angle (θst) satisfy the following Equation 2

$$\theta st = 90° - \theta i \qquad (2).$$

2. The optical system of augmented reality glasses with a saw tooth-type partial reflector array according to claim 1, wherein the transmissive surface is configured such that the transmission angle (θt) of the image light on the transmissive surface is 0° to 20°.

3. The optical system of augmented reality glasses with a saw tooth-type partial reflector array according to claim 1, wherein the reflective surface is configured such that the reflection angle (θr) of the image light on the reflective surface is 45° to 70°.

4. The optical system of augmented reality glasses with a saw tooth-type partial reflector array according to claim 1, wherein the polarization coating layer has an S-pol component and when a transmission angle (θt) is in the range of 0° to 20°, a reflectance is 10% or lower.

5. The optical system of augmented reality glasses with a saw tooth-type partial reflector array according to claim 1, wherein the polarization coating layer has an S-pol component and when the reflection angle (θt) is in the range of 45° to 70°, a reflectance is 50% or higher.

6. The optical system of augmented reality glasses with a saw tooth-type partial reflector array according to claim 1, wherein the polarization element determines a polarized component of S-pol.

7. The optical system of augmented reality glasses with a saw tooth-type partial reflector array according to claim 1, wherein the plurality of reflective surfaces is parallel to each other or the plurality of transmissive surfaces is parallel to each other.

8. The optical system of augmented reality glasses with a saw tooth-type partial reflector array according to claim 1, wherein the transmission angle (θst) has an angle in the range of −10° to 10° rather than 90°−the incident angle (θi).

9. The optical system of augmented reality glasses with a saw tooth-type partial reflector array according to claim 1, wherein the polarization element may be at least one of a reflective polarization film, an absorptive polarization film, a polarizing coating which converts an unpolarized beam or partially polarized beam into a linearly polarized beam to be transmitted or reflected, and a means to convert a direction of a polarized component using a phase shift element.

* * * * *